United States Patent [19]
Bartley et al.

[11] Patent Number: 4,952,134
[45] Date of Patent: Aug. 28, 1990

[54] APPARATUS FOR FORMING A BLOW-MOLDED BOTTLE WITH BI-AXIALLY STRETCHED SKIRT

[75] Inventors: Harold D. Bartley, Springfield; William R. Gaiser, Dayton, both of Ohio

[73] Assignee: Broadway Companies, Inc., Dayton, Ohio

[21] Appl. No.: 325,169

[22] Filed: Mar. 17, 1989

Related U.S. Application Data

[63] Continuation-in-part of Ser. No. 157,449, Feb. 19, 1988, Pat. No. 4,861,260.

[51] Int. Cl.$^5$ .............................................. B29C 49/12
[52] U.S. Cl. .................................. 425/525; 215/1 C; 220/70; 264/532; 425/529
[58] Field of Search ............... 425/522, 525, 529, 533; 264/296, 531, 532, 537; 215/1 C; 220/70; 428/36.9, 36.92, 542.8

[56] References Cited

U.S. PATENT DOCUMENTS

| | | | |
|---|---|---|---|
| 3,598,270 | 8/1971 | Adomaitis et al. | 220/70 X |
| 3,843,005 | 10/1974 | Uhlig | 215/1 C |
| 3,899,279 | 8/1975 | Hudson et al. | 264/532 X |
| 3,926,324 | 12/1975 | Zavasnik | 215/1 C |
| 3,933,246 | 1/1976 | Fulton | 220/70 X |
| 3,949,034 | 4/1976 | Uhlig | 264/296 X |
| 4,177,139 | 12/1979 | Gittner et al. | 264/532 X |
| 4,364,721 | 12/1982 | Rainville | 425/529 X |
| 4,382,769 | 5/1983 | Younkin et al. | 425/525 |
| 4,436,216 | 3/1984 | Chang | 215/1 C |
| 4,438,856 | 3/1984 | Chang | 215/1 C |
| 4,457,688 | 7/1984 | Calvert et al. | 425/529 X |
| 4,465,199 | 8/1984 | Aoki | 215/1 C |
| 4,518,558 | 5/1985 | Anway et al. | 425/525 X |
| 4,547,333 | 10/1985 | Takada | 425/529 X |
| 4,780,257 | 10/1988 | Beck | 264/537 X |

FOREIGN PATENT DOCUMENTS 1058566  7/1979  Canada .................................. 220/70

*Primary Examiner*—Richard L. Chiesa
*Attorney, Agent, or Firm*—Biebel, French & Nauman

[57] ABSTRACT

Apparatus for forming a self-standing skirt on the pressure bottom of a blow-molded carbonate beverage container. The preform is formed with an annular depending skirt, and the skirt is stretched with a stretch mechanism which engages all but a lower portion of the preform, so that during the stretching of the preform concurrently with the blowing of the preform in a bottle mold, the lower portion folds inwardly to form a bottom ledge on the stretched skirt. The mold is provided with a centering mechanism for assuring the centering of the preform within the mold cavity to assure that the preform skirt receives the skirt stretching mechanism.

3 Claims, 11 Drawing Sheets

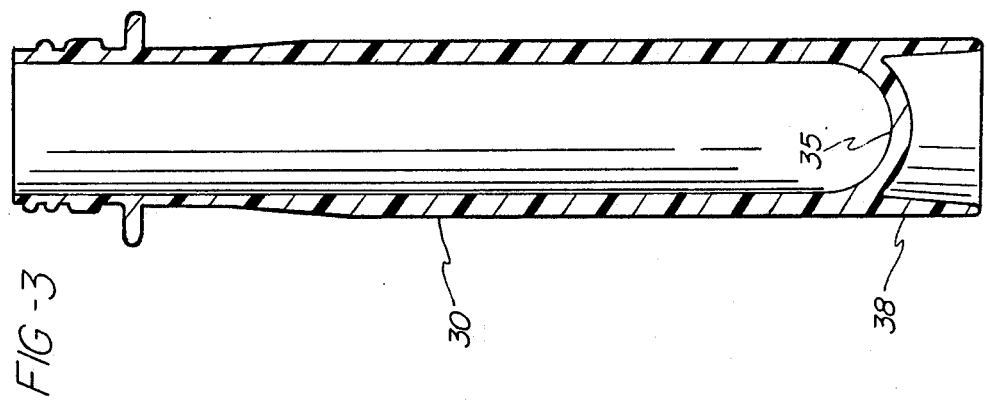
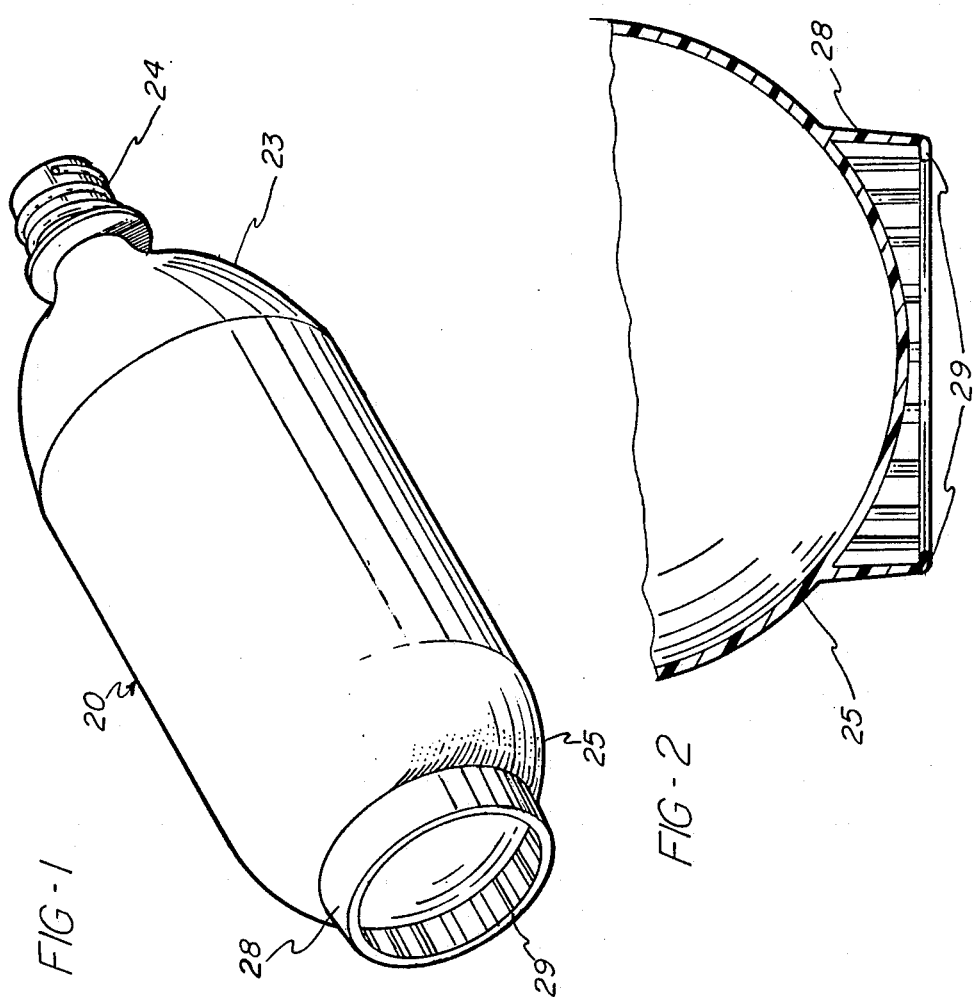

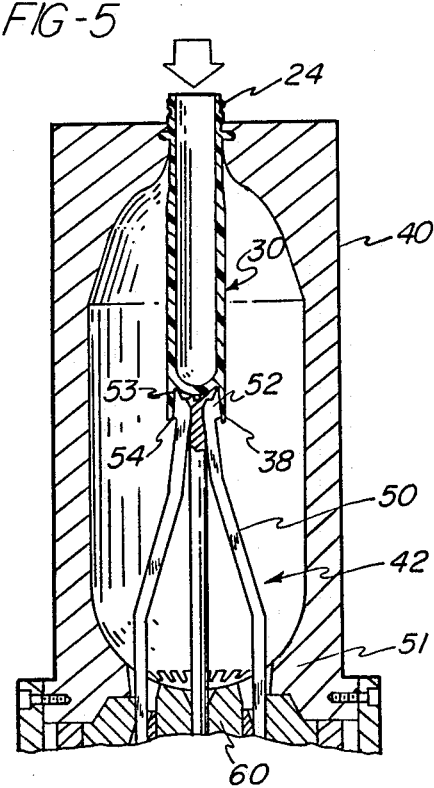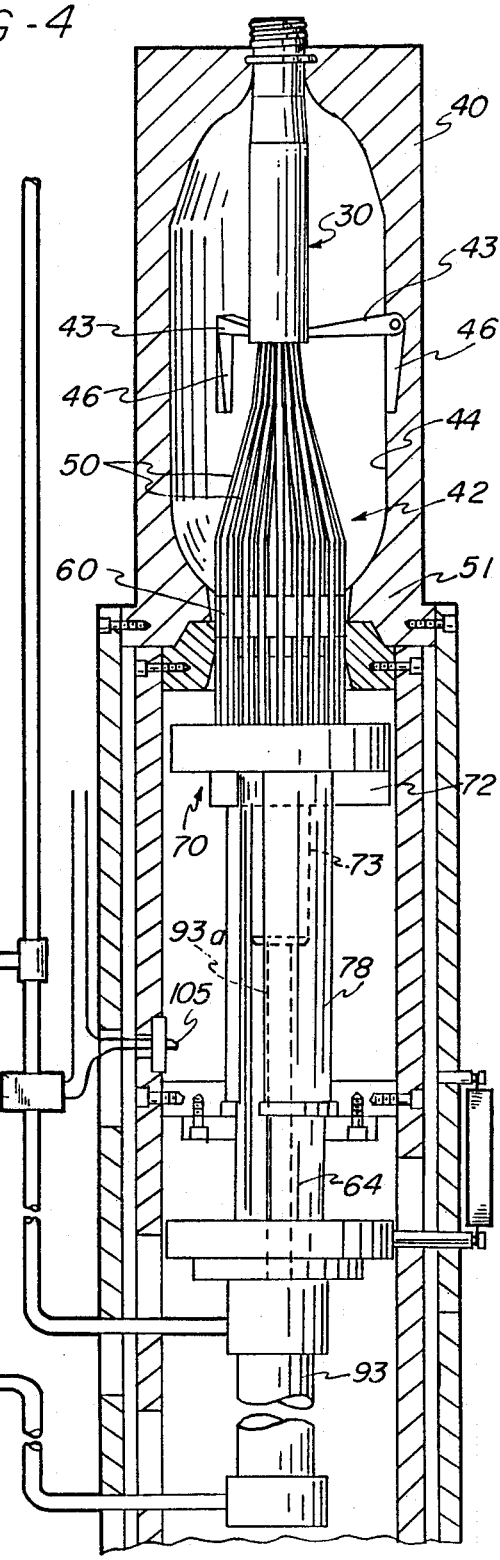

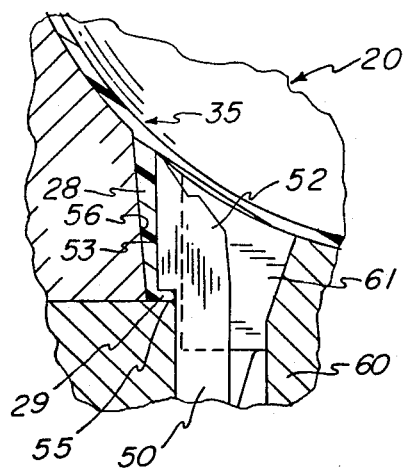
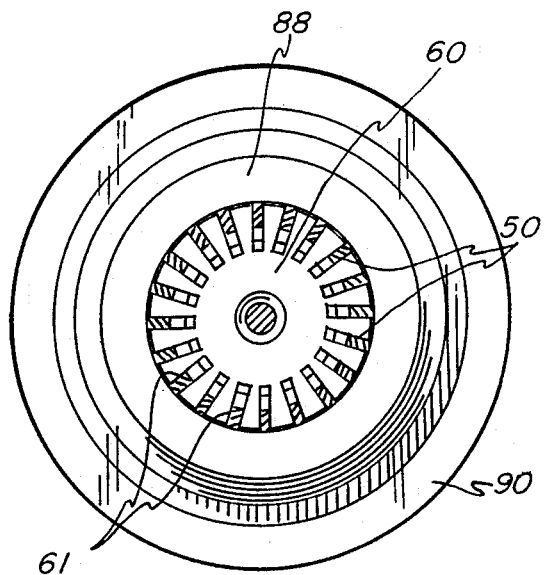
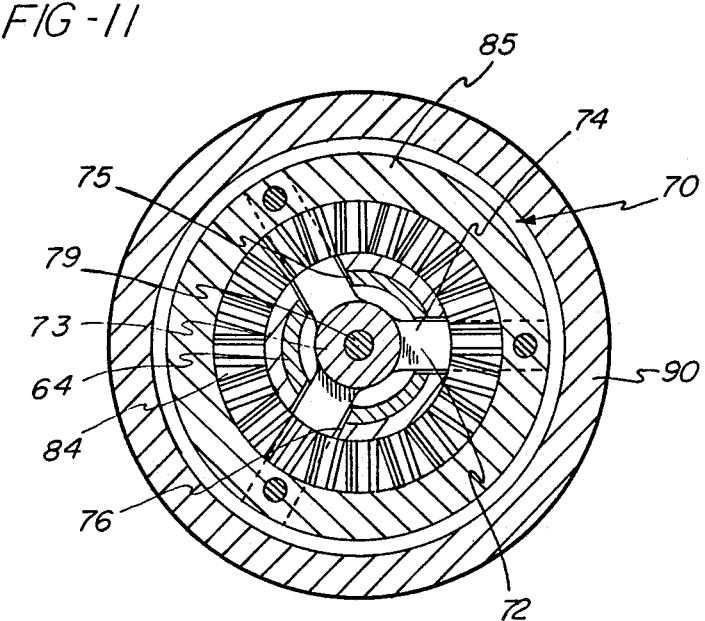

APPARATUS FOR FORMING A BLOW-MOLDED BOTTLE WITH BI-AXIALLY STRETCHED SKIRT

RELATED APPLICATION

This application is a continuation-in-part of application Ser. No. 157,449 filed Feb. 19, 1988 now U.S. Pat. No. 4,861,260 issued Aug. 21, 1989.

BACKGROUND OF THE INVENTION

This invention relates to self-standing blow molded bottles having pressure bottoms, such as for carbonated beverages and the like, and more particularly relates to improvements to the bottle, mechanism and method as disclosed and claimed in the above-identified application, incorporated herein by reference. In that application, a blown bottle with a pressure bottom is formed with a bi-axially stretched integral single-thickness skirt for supporting the bottle in a self-standing condition.

SUMMARY OF THE INVENTION

This application discloses a simplified skirt forming mechanism, capable of high speed and reliable operation. Also disclosed herein is an improved bottle skirt configuration, and apparatus and method for making the same, in which the lower terminal end of the skirt is turned radially inwardly to form a blunt and relatively widened bottom support surface for the bottle. The invention employs a preform having an extended annular skirt, as in the above copending application, but in this application, the skirt has an axial length which exceeds that of the axial contact regions of the fingers. This forms a terminal skirt portion which is not directly contacted during the stretch, and this portion folds radially inwardly by reason of the elasticity of the material, and forms the inwardly turned bottom ledge.

It is also necessary for the operating or stretching fingers to enter the preform skirt portion fully and accurately at the beginning of each blow cycle. Since a heated preform which does not extend true, in the center of the mold cavity from the top, could be missed by the stretching fingers, apparatus is provided by which centering of the preform is assured prior to blowing.

The bottle mold, at the bottom, is provided with a closure which is slotted to permit passage of the stretching fingers therethrough. The closure also defines an annular skirt-receiving slot into which the fingers take the stretched skirt and inwardly-turned ledge at the final part of the blow. A secondary mechanism is provided by which the ends of the fingers are retracted to clear the bottom skirt ledge and are then extracted from the formed skirt to permit the ejection of the blown bottle from the cavity.

It is therefore an object of the invention to provide a blown and stretched bottle with a pressure bottom, and a method for making the same, in which an integral stretched skirt extending from the bottom is formed with a blunt bottom edge, such as by an inwardly-turned ledge.

A further object of the invention resides in a method or process of forming an inwardly-turned ledge on the bottom of a single-thickness stretched skirt on the pressure bottom of a PET bottle.

Another object of the invention is to provide a simplified and reliable finger support and operating mechanism for bi-axially stretching the parison skirt portion during the blowing of the bottle.

A further object of the invention is to provide a mechanism for assuring the centering and positioning of a preheated preform in the mold cavity.

These and other objects and advantages of the invention will be apparently from the following description, the accompanying drawings, and the appended claims.

BRIEF DESCRIPTION OF THE DRAWINGS

FIG. 1 is a perspective view of a blown carbonated beverage bottle in accordance with this invention;

FIG. 2 in an enlarged partial sectional view through the bottle bottom and skirt;

FIG. 3 is a sectional view though the preform of this invention;

FIG. 4 is a somewhat diagrammatic sectional view through the bottle mold mechanism including the bottle mold and the finger operating mechanism, and also showing the primary air cylinder plumbing and controls;

FIG. 5 is a sectional view of a mold cavity portion of FIG. 4 showing an initial stage of the blow in which the distal ends of the fingers are received within the preform skirt, and in which the number of operating fingers is reduced to simplify the illustration;

FIG. 10 is a sectional view looking generally along the line 10—10 of FIG. 9;

FIG. 11 is a further sectional view looking generally along the line 11—11 of FIG. 9;

FIG. 15 is an enlarged fragmentary sectional view of a portion of the mold bottom and bottle bottom of FIG. 14;

DESCRIPTION OF PREFERRED EMBODIMENT

Figure 6:
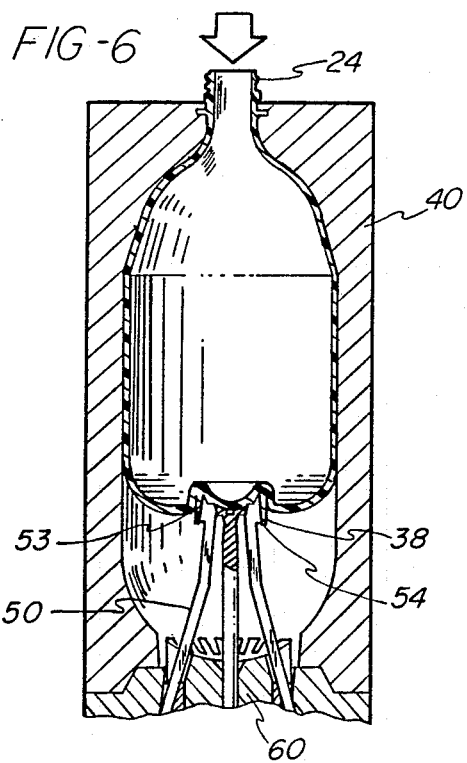
FIGS. 6, 7 and 8 are further views through the mold cavity similar to FIG. 5 showing progressive stages in the blowing of a pressure container in accordance with this invention.
Figure 7:
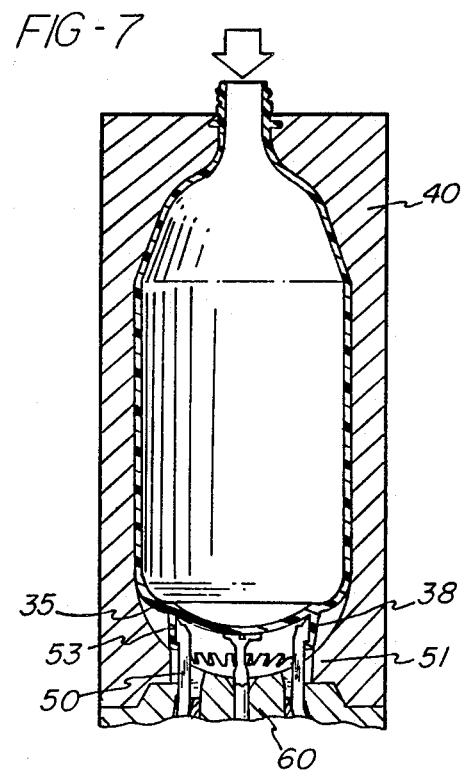
Figure 8:
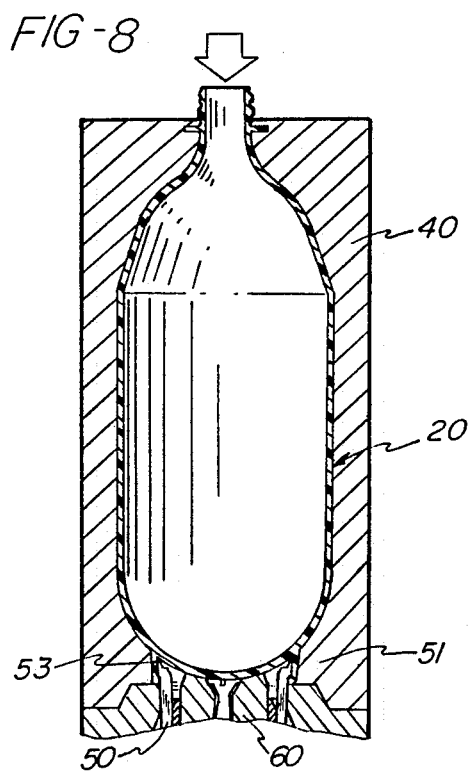

Referring to the figures of the drawings, which illustrate a preferred embodiment of the invention, a blown plastic pressure container or bottle formed of polyethylene terephthalate (PET) material is shown at 20 in FIG.

1. The bottle 20 of FIG. 1 is particularly useful as a container for carbonated beverages, as is blow molded with a generally cylindrical outer wall.

The upper part of the bottle 20 has a conventional upper neck 23 and a threaded end 24 adapted to receive a screw cap thereon. The bottle is also formed with a closed and generally semi-spherical pressure bottom 25, as shown in section in FIG. 2.

The bottle bottom 25 is formed with a depending, integral single thickness bi-axially stretched skirt 28 located on the bottom inwardly of the outer cylindrical diameter of the bottle wall 22. The skirt 28 extends axially of the axis of the bottle to a length which exceeds the maximum extent or depth of the curved bottom 25 within the skirt, and terminates in a lower inwardly-turned integral ledge or end 29. The ledge 29 defines and forms a relatively blunt and safe surface-contacting area for the bottle, and provides added stability for the support of the container.

The preform 30 from which the bottle 20 is formed is shown in sectional view in FIG. 3, in which like parts are numbered with like numbers plus 10. The preform is formed of PET material by injection molding. The preform 30 is formed with a depending skirt portion 38 which will become the skirt 28 of the finished bottle 20. The skirt portion 38 extends generally axially below the closed bottom portion 35 of the preform. The skirt portion 38 extends to a length so as to provide a small amount of excess material which will form the inwardly-turned ledge 29 of the finished bottle of FIGS. 1 and 2.

The preform is preheated and inserted conventionally into a split blow mold 40, shown in FIGS. 5 and 6 for blowing through the open end 24. It is important that the preform be accurately formed, with uniform wall thickness, so as not to sag or deflect sideways in the mold interior when reheated, to provide a reliable target for the finger stretching mechanism 42. However, FIG. 4 illustrates a modified and improved form of the blow mold in which a plurality of locating or centering arms 43 are pivotally carried on the mold side wall 44, and are movable to the operating position shown, for centering the preform in the mold cavity during engagement by the stretching mechanism 42. Thereafter, the arms 43 are retracted into arm-receiving slots 46 formed in the mold wall 44, and form a smooth continuation of the wall surface. Three such arms 43 may be used to assure such centering, as required.

It is helpful for an understanding of the method and the mechanism of the invention to refer briefly to the progression of views represented by FIGS. 5-8. The mechanism 42 includes an annular array of individual articulated fingers 50, which extend upwardly into the mold interior through the mold bottom 51 during the blowing cycle. The finger support and operating mechanism are described in detail below, but for the purpose of following the blowing progression in FIGS. 5-8 it is sufficient to understand that the fingers are identical, and have upper distal ends 52 which are proportioned to be received within the confines of the preform skirt portion 28, as a circular array.

The ends 52 have outwardly-facing axial working surfaces 53 (FIG. 15) which have a length less than the axial length of the preform skirt portion 38, so that when the finger distal ends 52 are fully inserted within the skirt portion 38, a small bottom or terminal portion 54 of the skirt extends below the finger working surfaces 53.

Cams in the mechanism 42 program the radial movement of the fingers 50 concurrently with, and in response to, the movement of the preform 30 within the mold cavity under the influence of the air pressure within the preform. The progression of movement may be seen by examining the relative positions of the parts in FIGS. 5-8. As the preform expands into the mold 40, the fingers grip the skirt portion 38 and cause it to expand in diameter along with the expansion of the bottom 35, by bi-axially stretching the PET material. At the same time, the fingers retreat out the mold through the mold bottom 51. The motive power for this movement is that of the preform itself, under the influence of the air pressure within.

Since a free portion 54 of the skirt extends below or beyond the finger working faces or surfaces 53, this portion inherently resists stretching, and the internal tension causes this portion to curve radially inwardly into a recess 55 provided under each finger face 53. In this manner, the annular inwardly-turned ledge 29 is formed in the finished bottle during the blowing of the preform 30 into the shape of the finished bottle 20.

The mold bottom is configured with a tapered wall 56 to receive the skirt at the end of the blow, with the ledge 29 trapped under the finger stretching faces 53 at the recesses 55, as shown in enlarged detail in FIG. 15. The slight taper in the wall 56 imparts a corresponding taper to the outer surface of the skirt 28 in the finished product.

Referring now to FIGS. 9-12, the fingers 50 extend through a slotted mold bottom plug or closure 60. As shown in the sectional view of FIG. 10, the bottom closure 60 is formed with partial radial slots 61 which extend inwardly from the outer circumference, and receive the fingers 50 therethrough. The closure 60 is mounted on the head or end of a slotted support tube 64.

Figure 9:
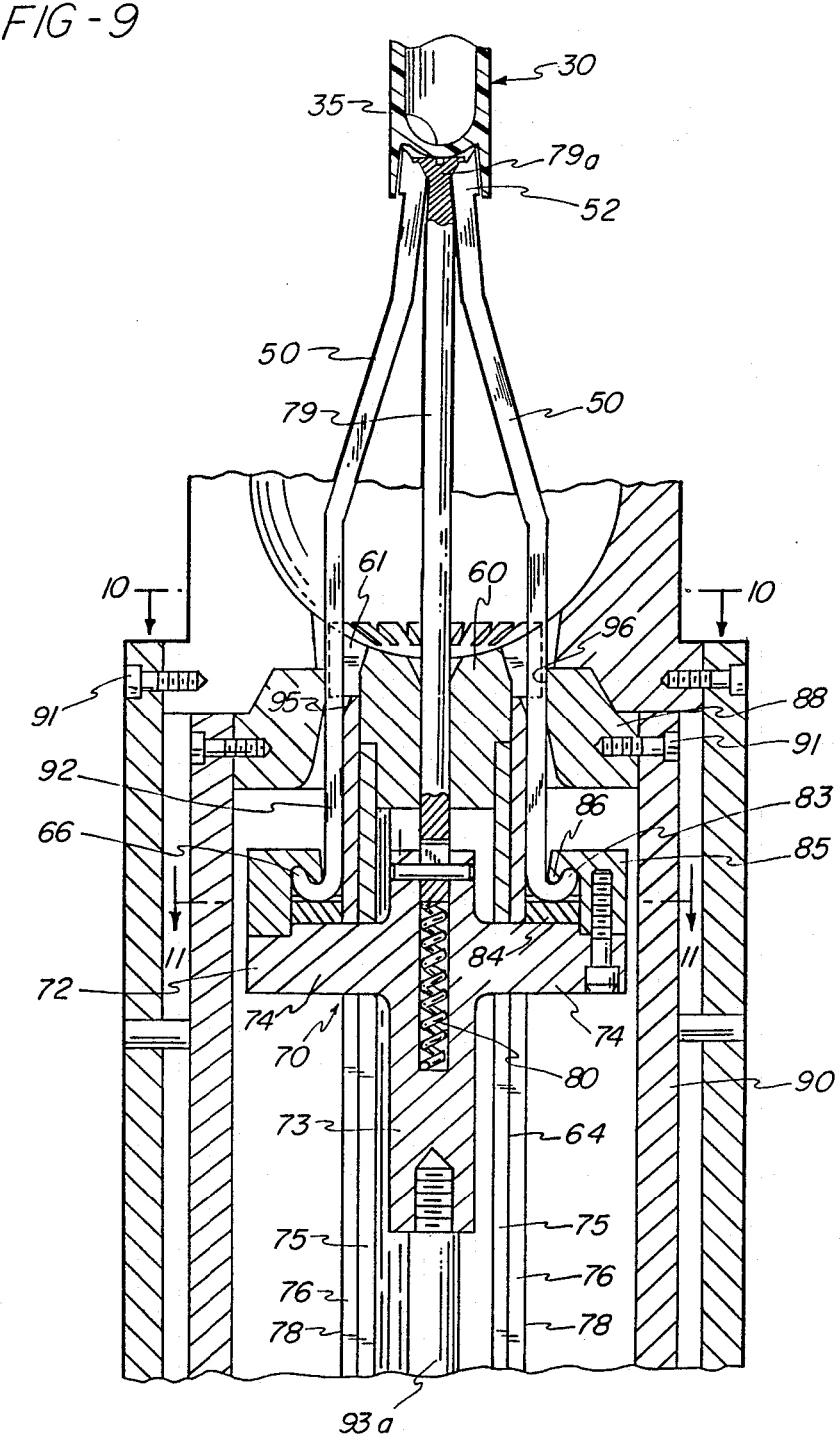
FIG. 9 is a fragmentary section, on an enlarged scale, through the mold bottom and bottom closure, and showing a portion of the finger mechanism and support, with the parts being shown at the beginning of the blow.

The bottom closure 60 is normally supported or positioned in a seated position in the mold bottom, as shown in FIG. 9, but may be retracted together with the fingers 50 by a secondary operating piston mechanism as described in connection with FIGS. 16-18. For the present description, it may be considered as fixed in the position in which it is shown in FIG. 9.

As previously noted, the arms 50 are identical, and have lower outwardly curved support ends 66 carried in an arm carrier yoke assembly 70 external to the mold 40. The yoke assembly includes a three-arm yoke 72. The yoke 72 has a main cylindrical body 73 positioned within the tube 64, with arms 74 at 120° positions extending through vertical slots 75 in the tube 64, as shown in the sectional view of FIG. 11. The arms also extend through radially aligned slots 76 in an outer cam tube 78 which tube is independent of and concentric with the tube 64.

A push pin 79 is carried on the body 73 with an enlarged upper end 79a in engagement with the parison bottom 35 within the arm ends 52. The lower end of the push pin 79 bears against a compression spring 80, and is retained on the body 73 for limited vertical movement by a cross pin 81 in a slot 82.

The lower ends 66 of the fingers 50 are curved upwardly and outwardly, to form bottom curved heels leading to upwardly-turned ends 83. The fingers rest against the upper surface of the thrust washer 84 on the yoke 72, and the fingers are retained on the washer 84 by an annular retainer 85. The retainer has a nose portion 86 received within the recess between the heels and the ends 83 of the fingers, and thereby captures the fingers in place, but permits the fingers to pivot in and out by rocking movement.

Initially, that is at the beginning movement of the fingers during the blow, the fingers are guided by an annular outer cam piece 88. The cam piece 88 is supported on the top of a tubular side plate 90 by bolts 91, and in an upper position, is nested under the mold bottom. In this position, the straight lower shank portions 92 of the fingers 50 are guided between the inside surface of the cam piece 88 and the outside surface of the outer cam tube 78.

The downward movement of the fingers, as supported on the yoke assembly 72, is controlled by the piston rod 93a of a first double acting air cylinder 93 (FIG. 4). As shown in FIG. 9, the lower end of the body 73 is threaded onto the piston rod 93a, and supported thereon. During the blow, the movement of the fingers 50, and the concurrent movement of the pin 79, causes air to be expelled from the region below the piston, the rate of which may be suitably controlled as desired, to exert some back pressure on the fingers and on the head of the pin 79. The direction of movement of the yoke assembly 70 is shown by the arrows 93b in FIG. 12.

Figure 12:
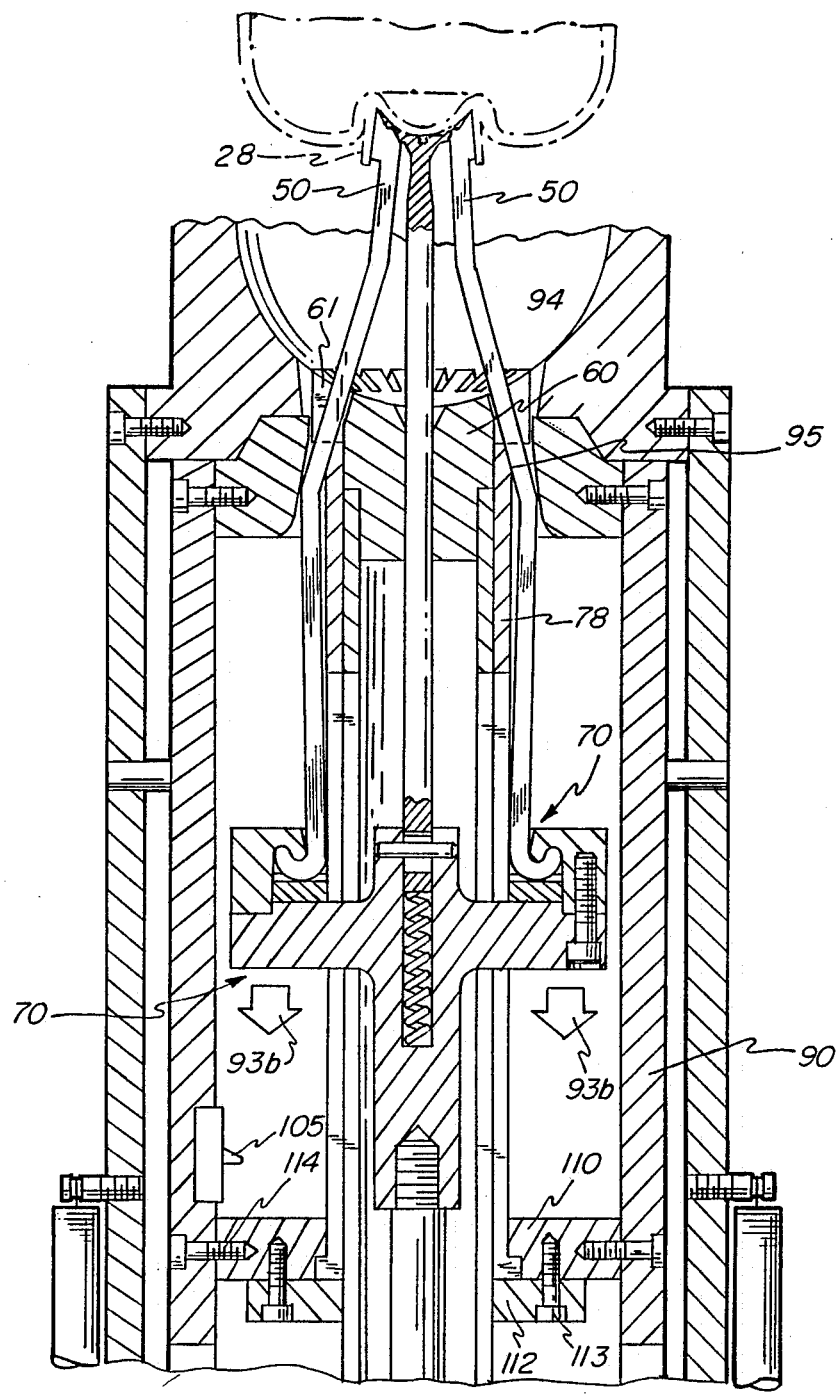
FIG. 12 is a view similar to FIG. 9 showing a moved position of the finger mechanism part way through the blow.

In the position of the fingers 50 as shown in FIG. 12, the inside surfaces of the inwardly sloping straight finger sections 94 engage a chamfered annular cam surface 95 at the top of the cam tube 78. The downward movement of the yoke assembly 70 causes the fingers to spread radially apart, thereby bi-axially stretching the skirt portion 28 as the bottle bottom expands.

Figure 13:
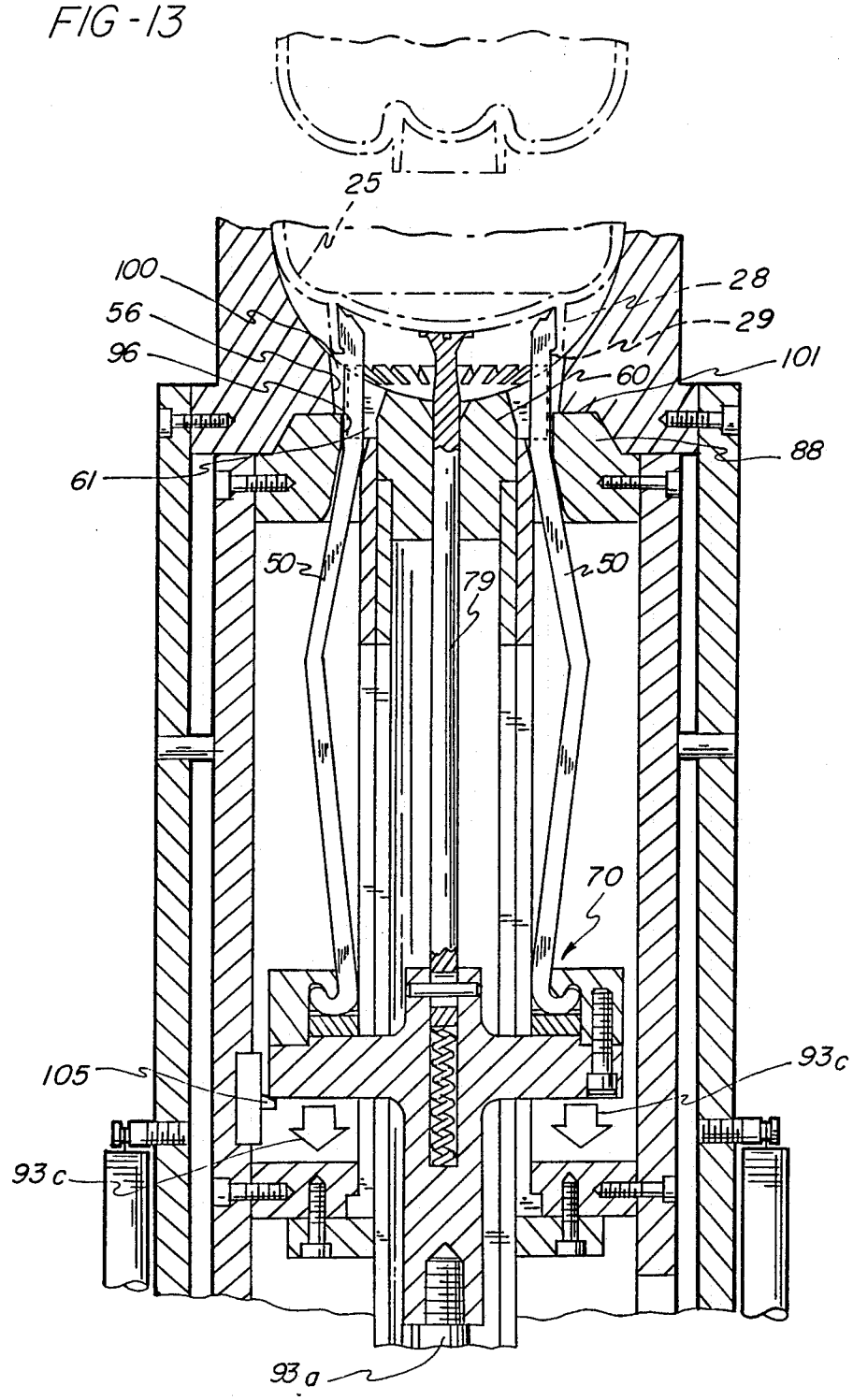
FIG. 13 is a further sectional view similar to FIG. 9 showing the finger stretch mechanism and the preform at a later stage in which the inwardly-turned bottom of the skirt has taken form.

When the bottom 25 arrives at the mold bottom, the fingers 50 and pin 79 have the positions as shown in FIG. 13. It should be noted that the exposed upper surface of the bottom closure 60 forms a smooth continuation of the contour of the mold bottom. At this time, the finger movement is guided by an axial surface 96 of the cam piece 88, to retract straight into the closure slots 61.

At the position of the parts in FIG. 13, the newly formed skirt 28 has an inwardly-turned ledge 29 formed thereon, as previously explained, and is ready to be received into the mold bottom, along the wall 56. The wall 56 surrounds the outer surface of the bottom closure 60 in slightly spaced relation, to define an annular slot 100 to receive the skirt 28. The slot 100 defines the final shape of the skirt, and the lower end of the slot terminates at a radially flat upper surface 101 of the cam piece 88, to define the configuration of the lower flat surface of the ledge 29.

Also, at the position of the parts as shown in FIG. 13, the yoke assembly 70 trips a switch 105. The switch 105 operates to open an air valve 106 (FIG. 4) to admit air above the piston of the cylinder 93, to retract the rod 93a and assist in the final movement of the skirt 28 into the mold bottom slot 100. This movement is shown by the arrows 93c in FIG. 13, and the position of the parts at the conclusion of the blow is that shown in FIG. 14.

The bottom of the outer cam tube 78 is captured between a fill ring 110 and a retainer ring 112 within the side plate 90. The retainer ring 112 is secured to the bottom of the fill ring 110 by screws 113, and the fill ring 110 is fixedly mounted on an inside surface of the side plate 90 by screws 114. The bottom of the inner support tube 64 is captured on the mounting plate 120 for the cylinder 93. The cylinder is, in effect, suspended on an outer frame tube 130 (FIG. 14) by support pins 132. The pins 132 extend radially from the cylinder mounting plate 120 through slots 133 in the side plate 90, and radially aligned slots 135 in the frame tube 130.

Figure 14:
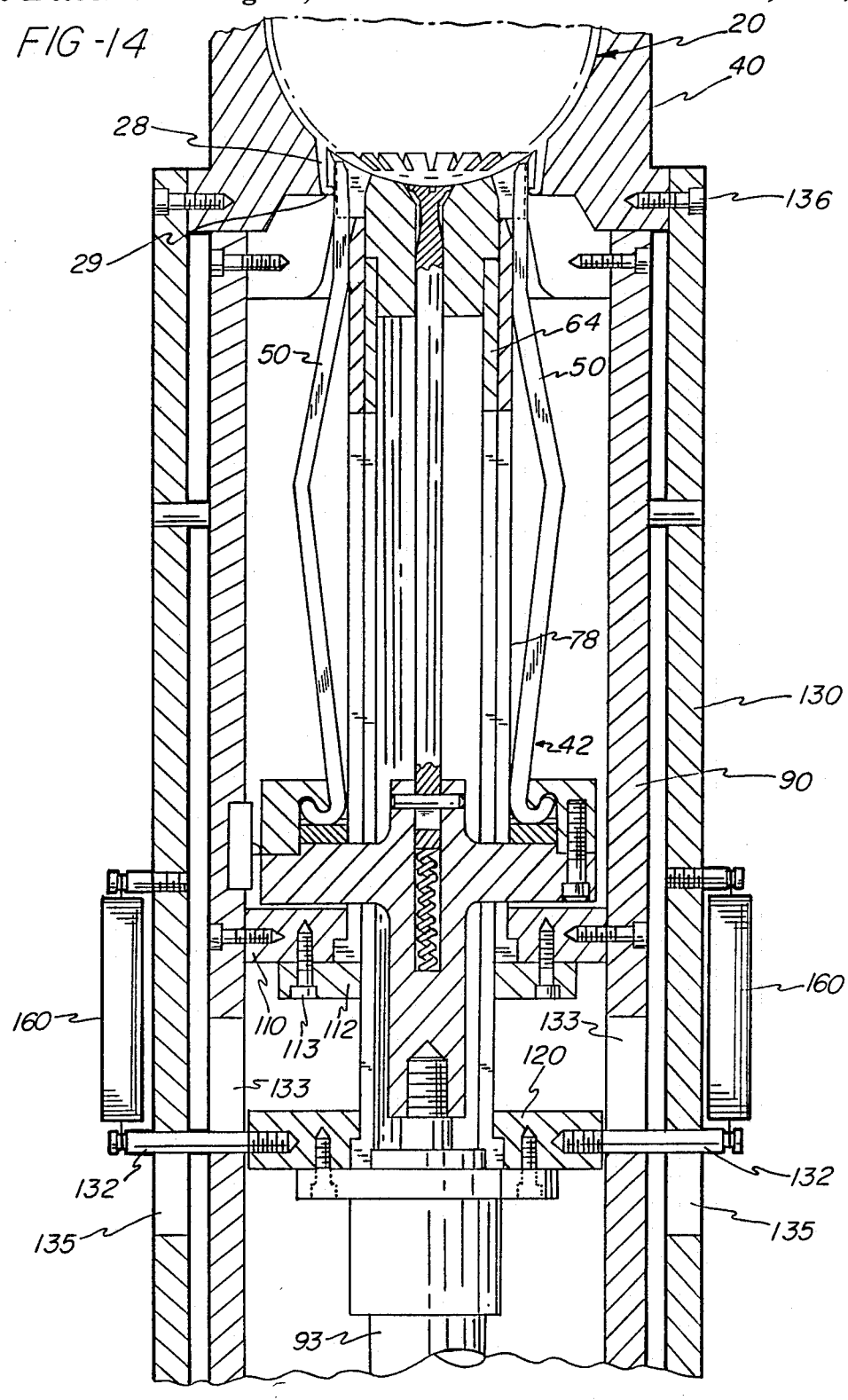
FIG. 14 is another sectional view similar to that of FIG. 9 and showing the stretch mechanism and the formed bottle bottom at the conclusion of the blow.
Figure 16:
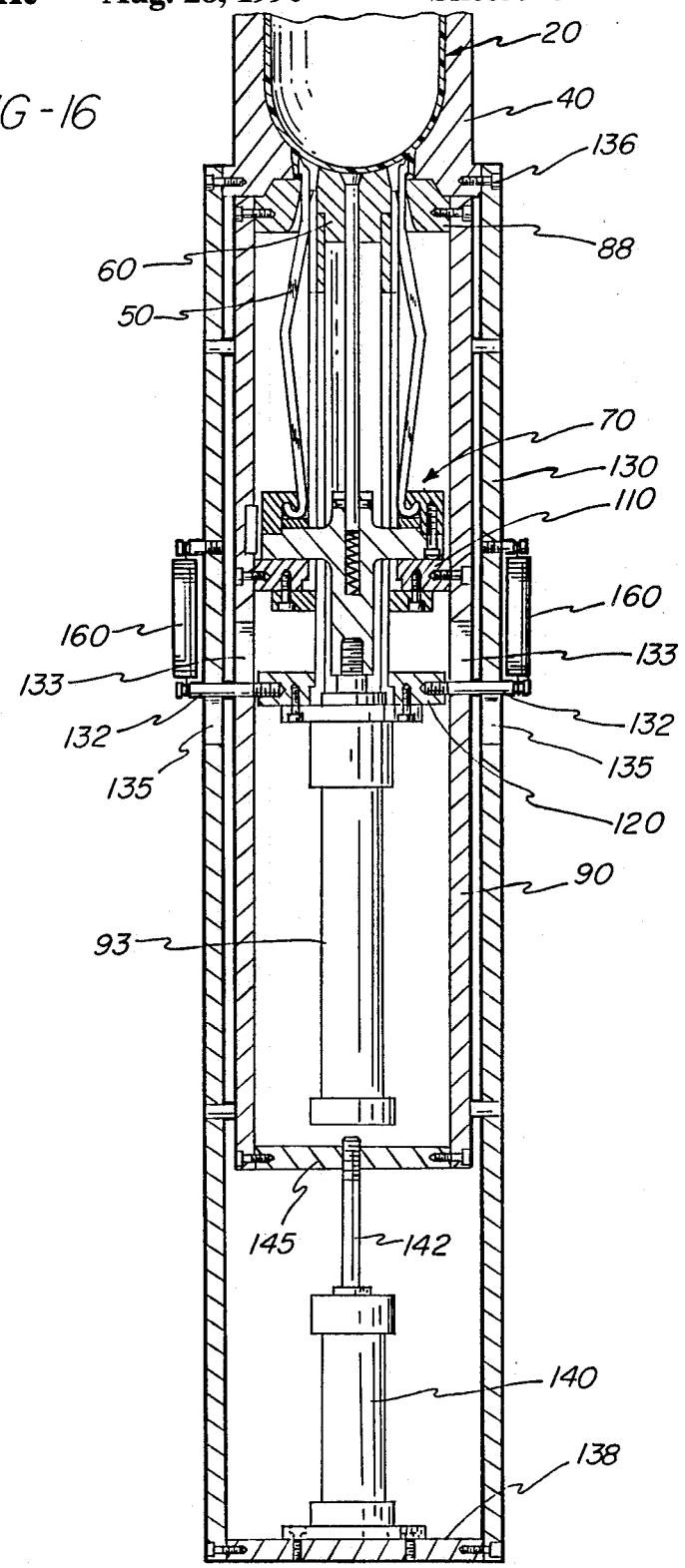
FIG. 16 is a sectional view through the operating mechanism showing the secondary cylinder operating mechanism which extracts the finger stretch mechanism from the formed bottle bottom and from the mold bottom.

As shown in FIGS. 14 and 16, the upper end of the frame tube 130 is secured to the mold 40, such as by screws 136, while the lower end (FIG. 16) is closed by a plate 138 to support a secondary cylinder 140. The rod 142 of the cylinder 140 engages the bottom plate 145 of the side plate 90, so that actuation of the secondary cylinder 140 will retract the plate 90 and all the parts carried thereon to the position from the position shown in FIG. 16 to the position shown in FIG. 18.

The secondary cylinder 140, and the limited sliding movement between the side plate 90 and the frame tube 130, comprise the means by which the finger mechanism 42 is extracted from the mold and from skirt 28 of the completed bottle at the end of the blow. When the parts, including the fingers 50, have reached the position as shown in FIG. 14, the bottle 20 is complete, and the skirt 28 is fully formed with the bottom inwardly-directed ledge 29 thereon. Now it is necessary to retract the distal ends of the fingers, to release their engagement with the skirt ledge 29 and to extract the same, so that the bottle may be ejected from the mold cavity.

Retraction springs 160 have held the pins 132 in the upper position, as shown in FIG. 14 to the completion of the blow cycle. When the cylinder 140 is actuated, the first movement is that of the tube 90 moving downwardly, as represented by the direction of the arrows 162 in FIG. 17. This movement causes the inside beveled or conical surface 164 of the cam piece 88 to draw down on the tapered outside surfaces of the fingers 50, causing the fingers to move radially inwardly in the direction of the arrows 164 (FIG. 17). In this position, the distal ends 52 of the fingers are now released from the skirt 28, and clear the ledge 29.

Figure 17:
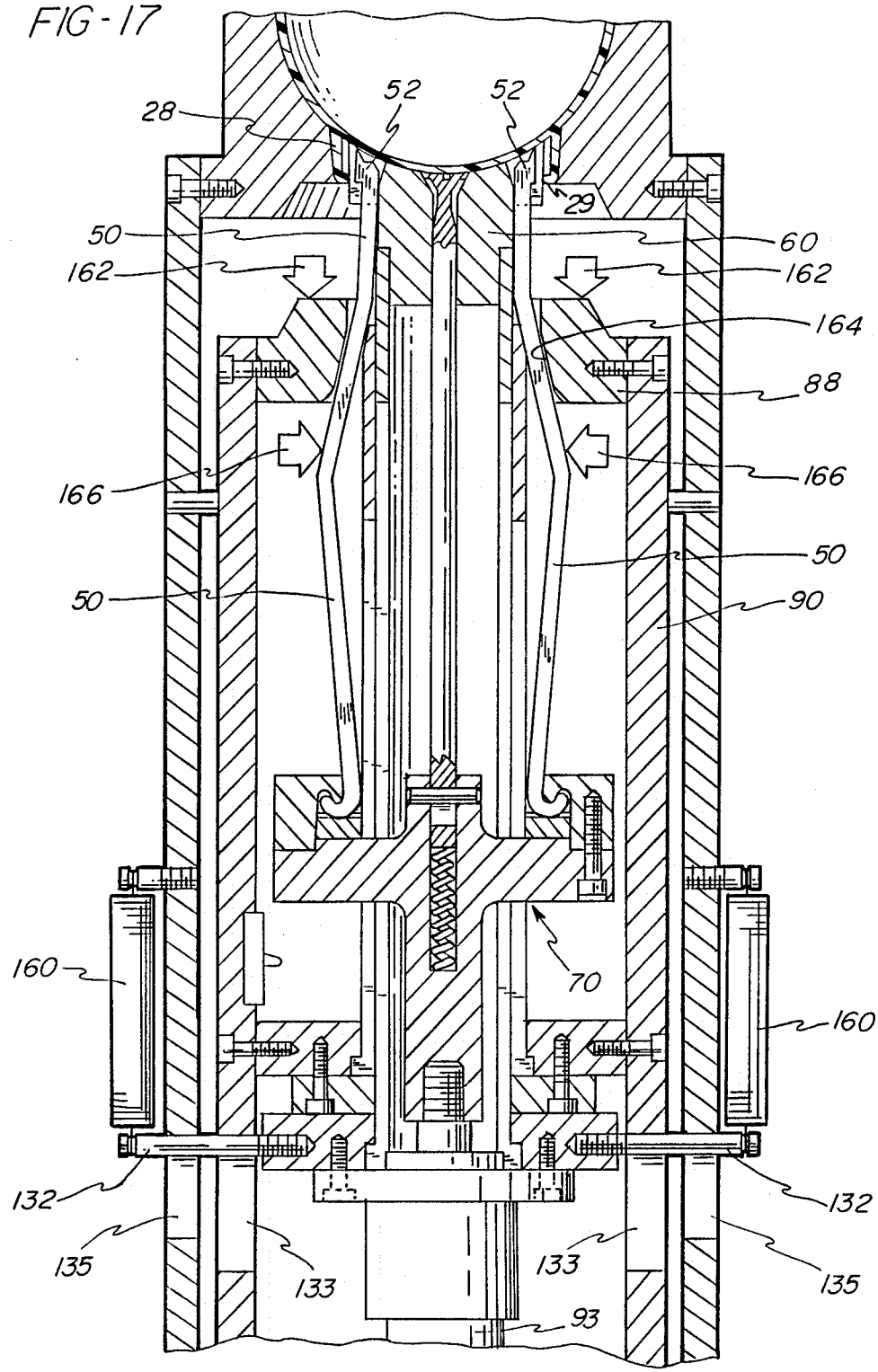
FIG. 17 is an enlarged sectional view of the upper portion of the mechanism showing a stage in the extraction of the fingers from the formed bottle bottom and the mold; and, FIG. 18 is a view similar to FIG. 17 showing the fully retracted position of the parts, in preparation for the opening of the mold and the ejection of the completed bottle.
Figure 18:
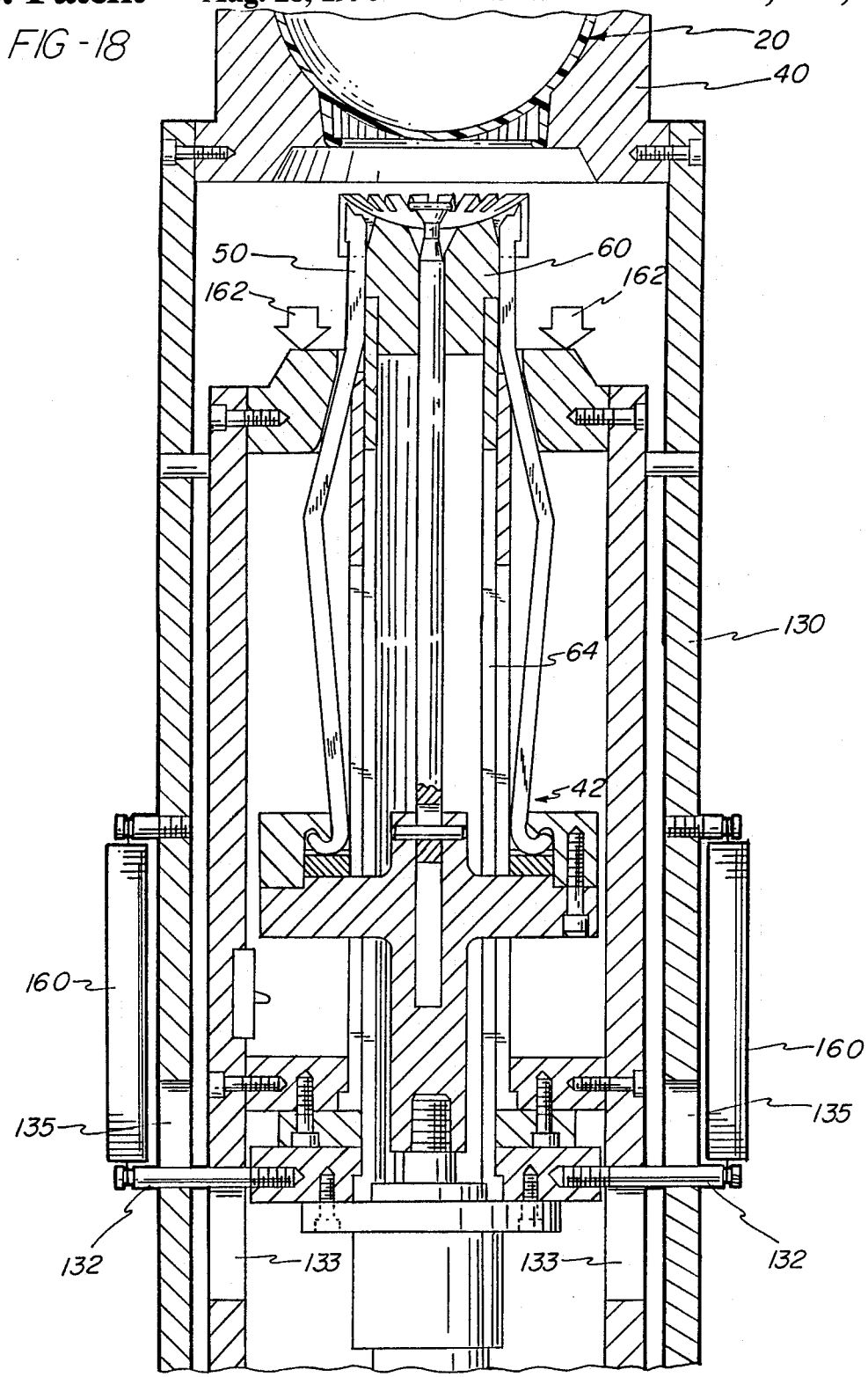

Next, continued movement of the secondary cylinder 140 pulls the primary cylinder support pins 132 and the support 130 from the position shown in FIG. 17 to the position shown in FIG. 18, in which the pins engage the top of the slots 133, and are caused to move to the bottom of the slots 135. This final movement is also in the direction of the arrows 162, and retracts the entire mechanism 42, including the inner support tube 64 and the closure 60, to a retracted position, in which the closure, the fingers and the cam plate are all retracted from the mold. This permits the unrestricted opening the mold to eject the finished bottle 20. Thereafter, the parts are returned to a starting position, ready for the insertion of a new preheated preform 30.

The operation of the invention and the practice of the method is largely self-evident from the foregoing description. Since a lower portion or end of the preform skirt portion extends below the finger contacting surfaces, when the skirt portion is stretched, this lower portion is free to turn radially inwardly by reason of the elastic tension in the material, to form the ledge 29 on the finished bottle.

The centering or positioning arms 43 should be operated prior to the insertion of the finger ends 52 within the preform skirt portion 38, to prevent inadvertent misalignment due to a canted or tilted preform, and then may be retracted into the mold walls.

While the method herein described, and the form of apparatus for carrying the method into effect, constitute preferred embodiments of this invention, it is to be understood that the invention is not limited to the precise method and form of apparatus, and that changes may be made in either without departing from the scope of the invention, which is defined in the appended claims.

What is claimed is:

1. Apparatus for forming a self-standing skirt on the pressure bottom of a blow-molded carbonated beverage container, comprising:

a blow mold having a top and a bottom, means in said top for supporting a bottle preform in depending relation in the interior of said mold, said preform being formed with a closed bottom portion and an axially extending skirt surrounding said bottom portion, mold bottom closure means in said mold bottom defining an annular slot-like skirt-receiving portion, means in said bottom closure means forming a plurality of finger-receiving slots positioned radially inwardly of said skirt receiving portion, preform skirt stretch means including a corresponding plurality of stretching fingers extending into the interior of said mold through said bottom closure means slots and arranged in a generally circular array in said mold, said fingers having distal ends proportioned to be received radially within said preform skirt in said mold with outer generally axial skirt-engaging faces, the axial length of said faces being less than the axial length of said preform skirt so that a lower portion of said skirt extends below said finger faces, means external to said mold cavity mounting said fingers for unison movement from a position in which said ends engage said preform prior to blowing to a retracted position in which said ends are recessed in said slots, cam means in engagement with said fingers for causing said fingers to spread said skirt during blowing and while said fingers are moving to said retracted position to a size so as to be received in said skirt-receiving slot-like portion while said skirt lower portion folds radially inwardly to form a ledge on the bottom of said stretched skirt.

2. Apparatus for the formation on a blow-molded container of a skirt on the container bottom to provide for the free standing of the container in an upright position, said container being blown in a mold cavity from a preform having an annular skirt portion at an end thereof remote from the container top and surrounding an end of the preform, comprising:

a mold having a mold cavity with a mold top for supporting said preform in depending relation in said cavity and a mold bottom, a plurality of articulated fingers extending through said mold bottom into the interior of said mold cavity and arranged in an annular array, said fingers terminated in outwardly-facing skirt-spreading surfaces proportioned to be received within said preform skirt portion prior to blowing of said preform, said surfaces having a length in the axial direction less than the axial length of said skirt portion with a lower free end of said skirt portion extending below sand finger surfaces, a finger support mechanism external to said mold cavity supporting said fingers for axial and radial movement with respect to said mold cavity, said external means including cam means in engagement with said fingers, said finger support mechanism being responsive to movement of said preform in said mold cavity during blowing thereof for causing a defined radial movement of said fingers in unison concurrently with axial movement thereof, to stretch said skirt portion into an annular support skirt on the container bottom and providing for the folding radially inwardly of said skirt portion lower free end to form an inwardly extending ledge on the bottom of said skirt.

3. Apparatus for the formation on a blow-molded container of a skirt on the container bottom to provide for the free standing of the container in an upright position, said container being blown in a mold cavity from a preform having an annular skirt portion at an end thereof remote from the container top and surrounding an end of the preform, comprising:

a mold having a mold cavity with a mold top for supporting said preform in depending relation in said cavity and a mold bottom, and having a side wall, skirt stretch means extending through said mold bottom into said mold cavity and terminated in skirt-spreading surfaces proportioned to be received within said preform, and means in said mold engageable with said preform for centering said preform in said mold to align said preform skirt portion to receive said skirt stretch means, said centering means including a plurality of arms, means pivotally mounting said arms in said mold side wall for movement from a retracted position in said side wall to an extended position into the interior of said mold for centering an off-center preform in said mold cavity.

* * * * *